United States Patent Office.

JAKOB SCHMID, OF BASLE, SWITZERLAND, ASSIGNOR TO THE SOCIETY OF CHEMICAL INDUSTRY IN BASLE, OF SAME PLACE.

MEDICAL COMPOUND.

SPECIFICATION forming part of Letters Patent No. 504,626, dated September 5, 1893.

Application filed March 16, 1893. Serial No. 466,364. (No specimens.)

*To all whom it may concern:*

Be it known that I, JAKOB SCHMID, a citizen of Switzerland, residing at Basle, Switzerland, have invented new and useful Improvements in the Production of a Medical Compound which may be Usefully Employed as an Antipyretic and Antineuralgic, of which the following is a specification.

My invention relates to the production of a new antipyretic and antineuralgic compound obtained by the condensation of para amidophenolethers with salicylaldehyde. The reaction which takes place may be expressed by the following chemical equation:

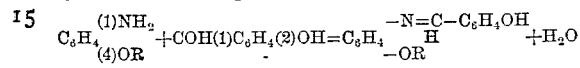

where R represents methyl or ethyl.

In carrying out my invention practically I proceed as follows: The solutions of twenty-three kilos of salicylaldehyde in one hundred kilos of alcohol and twenty-six kilos of paraphenetidin in one hundred kilos of alcohol, are mixed together at an ordinary temperature. The mixture becomes warm by spontaneous heat and solidifies after a short time into a magma of yellowish colored flat needles, which, after being allowed to stand during several hours, are pressed and recrystalized from hot alcohol. The thus obtained substance consists of yellowish colored flat needles and corresponds to the formula:

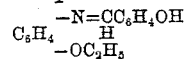

melting at from 90° to 91° centigrade. It is insoluble in water, difficultly soluble in dilute hot caustic soda, easily in ether, benzene and hot alcohol with a pale yellow coloration and is decomposed into phenetidin and salicylaldehyde by treating with dilute acids. It is administered in varying doses up to three grams according to the cause of sickness.

Having thus described my invention, what I claim as new, and desire to secure by Letters Patent, is—

The medical compound herein described of the formula:

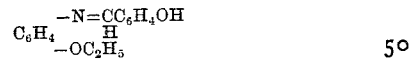

which crystallizes in yellowish colored flat needles melting at from 90° to 91° centigrade and is insoluble in water, difficultly soluble in dilute hot caustic-soda, but of easy solubility in ether, benzene and hot alcohol with a pale yellow coloration.

In testimony whereof I have hereunto set my hand in the presence of two subscribing witnesses.

JAKOB SCHMID.

Witnesses:
F. WALTER,
GEORGE GIFFORD.